(12) United States Patent
Schneider

(10) Patent No.: US 8,496,394 B2
(45) Date of Patent: Jul. 30, 2013

(54) CONNECTING ARRANGEMENT AND CONNECTING METHOD, IN PARTICULAR BY WAY OF NON-POSITIVE CONNECTION ON ALL SIDES

(75) Inventor: Harald Norbert Schneider, Uznach (CH)

(73) Assignee: Nord-Lock AG, St. Gallenkappel (CH)

( * ) Notice: Subject to any disclaimer, the term of this patent is extended or adjusted under 35 U.S.C. 154(b) by 53 days.

(21) Appl. No.: 12/678,733

(22) PCT Filed: Sep. 16, 2008

(86) PCT No.: PCT/DE2008/001538
§ 371 (c)(1),
(2), (4) Date: Apr. 19, 2010

(87) PCT Pub. No.: WO2009/036740
PCT Pub. Date: Mar. 26, 2009

(65) Prior Publication Data
US 2010/0226715 A1    Sep. 9, 2010

(30) Foreign Application Priority Data
Sep. 18, 2007 (DE) .......................... 10 2007 044 404

(51) Int. Cl.
*F16B 13/06* (2006.01)
(52) U.S. Cl.
USPC ........ 403/370; 403/337; 403/408.1; 411/60.1
(58) Field of Classification Search
USPC .................... 411/55, 60.1, 60.2, 69; 403/337, 403/370, 371, 374.1–374.4, 408.1, 409.1
See application file for complete search history.

(56) References Cited

U.S. PATENT DOCUMENTS

| | | | | |
|---|---|---|---|---|
| 1,596,856 | A | * | 8/1926 | Setlow ............................ 411/75 |
| 2,321,170 | A | * | 6/1943 | Wallace ....................... 411/60.1 |
| 3,271,058 | A | * | 9/1966 | Anderson ................... 403/408.1 |
| 3,974,734 | A | | 8/1976 | Matchtle |

(Continued)

FOREIGN PATENT DOCUMENTS

| | | | |
|---|---|---|---|
| EP | 0 633 404 A1 | | 1/1995 |
| EP | 0 984 173 | | 3/2000 |
| GB | 2181511 A | * | 4/1987 |
| GB | 2245326 A | * | 1/1992 |

OTHER PUBLICATIONS

International Search Report dated Feb. 2, 2009.

(Continued)

*Primary Examiner* — Joshua Kennedy
(74) *Attorney, Agent, or Firm* — Knobbe Martens Olson & Bear LLP

(57) ABSTRACT

A method or arrangement for clamping at least one first and one second component to each other with a connection by force on all sides is disclosed. The connecting arrangement comprises a bolt extending from a first component through a through opening in a second component, a clamping nut which is screwed on the bolt for clamping the components, and a cone pair comprising an inner cone with a split and an outer cone. One part of this cone pair is formed as a conical clamping element, which is arranged and axially moveable for radial clamping on the bolt between the components and the clamping nut. A locking nut is screwed on the conical clamping element and clampable against an abutment surface of the second component to limit moveability of the clamping element.

20 Claims, 6 Drawing Sheets

U.S. PATENT DOCUMENTS

| | | | | |
|---|---|---|---|---|
| 4,496,259 A | * | 1/1985 | Foucher | 403/14 |
| 4,685,188 A | * | 8/1987 | Goy | 29/446 |
| 4,743,138 A | * | 5/1988 | Goy | 403/337 |
| 4,978,264 A | | 12/1990 | Philippe | |
| 5,190,393 A | * | 3/1993 | Svensson | 403/370 |
| 5,374,145 A | * | 12/1994 | Mairesse et al. | 411/54 |
| 6,048,149 A | * | 4/2000 | Garcia | 411/55 |
| 6,200,080 B1 | * | 3/2001 | Bryan | 411/45 |
| 8,057,145 B2 | * | 11/2011 | Dolan et al. | 411/57.1 |

OTHER PUBLICATIONS

International Preliminary Report on Patentability dated Apr. 7, 2010.

* cited by examiner

CONNECTING ARRANGEMENT AND CONNECTING METHOD, IN PARTICULAR BY WAY OF NON-POSITIVE CONNECTION ON ALL SIDES

BACKGROUND

1. Field of the Invention

The invention relates to a connecting arrangement with connection by force on all sides, or to a connecting method.

2. Description of the Related Art

In particular in the construction of heavy machines, large-dimension connections are necessary, which have to be reliably clamped and also released. Screwed, positively connecting connecting elements are used especially in connections loaded by shearing forces. These connecting elements can only be clamped and released with difficulty, however, due to their size.

Considerable manufacturing effort must be encountered with positively connecting connecting elements, which clamp two components to be connected. Bores in the components to be connected must be made with great accuracy and a high surface finish. In actual assembly, the components to be connected must be aligned with each other, which can often only be achieved by repeated mechanical machining of the bore in situ because of the positively connecting connecting elements. Moreover, unwieldy and expensive tools are necessary for tightening and releasing screws and nuts of large connecting elements. The use of a slugging wrench is carried out without control and is very accident-prone. The use of a torque converter results in very high friction and is imprecise. The use of hydraulic tools requires a lot of space and results in only little usage of the materials.

A further drawback with positively connecting connecting elements is that they are problematic to service and maintain, because specialized tools and methods are required to release them again. Often, the connecting elements must even be destroyed, for example cut off, to remove them, which is often only possible with expensive and time-consuming improvisation.

Generally known as a fitting bolt is a connecting arrangement for connecting at least a first and a second component to be connected, wherein a through hole is formed in both components through which a bolt extends having the same diameter. Herein, the bolt is arranged in a fixed position with respect to the first component and has a thread on its end facing away from the first component. The two components are axially connected with each other by means of a nut screwed on the thread.

Furthermore, the use of a cone pair as an expansion bolt is known, which is arranged for radial pre-clamping at or on a bolt extending through two components.

Also known per se as a shearing sleeve is the forming of a split in a sleeve-like connecting element, to establish positive engagement irrespective of the manufacturing tolerances of the bore.

Furthermore, locking nuts are generally known which can be brought into a predetermined abutment position on a thread of a bolt, to prevent rotation of the bolt beyond the abutment position.

As a fitting pin there is also known a positively connecting connecting element which can transmit transverse forces in a joint between parts. Axial pre-clamping forces are however not possible.

As a pivot pin there is also known a positively connecting, and, depending on the structure, also on all sides by force connecting connecting element, for linking two components, i.e. connecting them so that they are rotatable about an axis of the pivot pin. Both radial and axial non-positive engagement/connection by force only act on one of the two components, i.e. the pivot pin is immovably joined with one of the two components. The other component is connected with the pivot pin only in positive engagement and can therefore rotate about the rotary axis.

As a shaft-hub connection there is also known a positively connecting clamping element, which also creates radial connection by force by means of a cone pair. However, a travel distance/stroke is neither adjustable nor limited.

EP 0 633 404 A1 describes a connecting arrangement for connecting two components while leaving a space between the two components to be connected. The first component is provided with a bore, which is formed for receiving a cone pair with an inner cone and an outer cone. Starting from the open side of the bore, the inner cone extends into the bore with an expanding inner diameter. The outer cone is inserted into the inner cone. The inner cone, as a sleeve-like component, has a through bore with an inner thread, into which a screw bolt in the form of a screw with a head is screwed as a clamping screw, wherein the screw extends through a through opening of the second component. With its end side facing the first component, the second component touches an outer surface of the sleeve-like inner cone, wherein the inner cone protrudes from the bore to such an extent that a predefined space is left between the two components. By tightening the clamping screw, the inner cone is adjusted in the direction toward the second component and therewith clamps the outer cone splitted in the longitudinal direction against a bore wall of the bore. This is how the cone pair is fixedly clamped in the bore of the first component, and the second component is attached to the first component in a spaced relationship by means of the clamping arrangement. This arrangement is both for positioning and fixing of machine parts spaced with respect to each other in space by means of an expansion bolt. The machine part is axially fixed exclusively by means of friction by the attachment element. It is therefore not a screwed connection but only a clamping means.

EP 0 984 173 A2 describes a connecting arrangement having a similar effect with a mounting element for the positioning and connecting of at least two components to be connected, wherein the mounting element cooperates with a connecting element in the form of a clamping bolt, which axially extends through the components in mounting openings and penetrates into the mounting element. The mounting element has its outer dimensions adapted to the components to be connected in such a manner that it extends through the mounting openings of all components except for the first component to be connected. The mounting element consists of a back sleeve and a front sleeve as an inner cone and outer cone, respectively, which are in loose engagement along a sliding surface with axial inclination. The sliding surface enables axial displacement of the two sleeves with respect to each other. The axial displacement of the two sleeves by clamping with the clamping screw thus results in an expansion of the outer dimension of the mounting element, so that it is clamped at least in the second component. It is therefore not a screwed connection, but only a clamping means.

U.S. Pat. No. 4,978,264 A describes two components to be connected with each other, in particular metal sheets, wherein a clamping arrangement is used for connecting. It consists of a middle clamping element with a through opening conically tapering and then expanding again, into which two further clamping elements are inserted from both sides. These also have conical side surfaces, extending parallel to the conically tapering or conically expanding sidewalls of the central clamping element. The two further clamping elements are inserted from the two opposite sides into the through opening of the central clamping element. A clamping screw extends through the first of the further clamping elements with the bolt into a screw thread of the second of the further clamping elements. By screwing together the screw the two further clamping elements are clamped toward each other thus pressing apart the central clamping element. The central clamping element is inserted in a through opening of one of the components to be connected and is clamped against the sidewall of the through opening in the component by means of screwing. The other of the two components to be connected is insertable or clamped between a flange of one of the further clamping elements and a flange of the central clamping element. It is therefore not a screw connection but only a clamping means.

BRIEF SUMMARY

The object of the invention is to suggest a connecting arrangement and a connecting method, respectively, with non-positive engagement/connection by force on all sides, wherein the pre-clamping forces acting on the components to be clamped together can be adjusted in the axial and radial direction independent of each other.

Accordingly, in particular, a connecting method is preferred, for connecting at least one first and one second component to be interconnected, in particular with non-positive engagement/connection by force on all sides, in which a bolt immovably or in a fixed position extending from the first component passes through a through opening in the second component, a clamping nut for clamping the components together is screwed onto a thread on the bolt, the thread especially being spaced at least from the first component, a conical clamping element is inserted either manually and/or with a predefined inserting force prior to screwing of the clamping nut between the components adjacent to one another and the clamping nut for radial clamping at or on the bolt in the direction toward the first component, after inserting the clamping element, a locking nut is screwed on the clamping element while leaving an abutment space greater than zero to the second component, and thereafter the clamping nut is clamped against the clamping element and/or against the locking nut.

Instead of a bolt with a thread and a clamping nut screwed onto it, the bolt being in the form of a screw with a head, i.e. a clamping screw, can also be screwed on or behind the first component with a thread of the bolt in the direction toward the first component for clamping the components. In this case a conical clamping element is inserted prior to screwing the bolt in the form of a clamping screw, between the components adjacent to one another and the head for radially clamping at or on the bolt in the direction toward the first component. In a final step, the head of the clamping screw is clamped against the conical clamping element and/or against the locking nut or against one or more locking screws.

As a further, equal effective embodiment, at least one locking screw can be screwed as a locking element instead of the locking nut on the clamping element after inserting the clamping element, while leaving an abutment space greater than zero to the second component.

As an equivalent to the head of the clamping screw, other components extending from the bolt or the clamping screw are also conceivable, which are fixedly attached to a head-side or to an end of the bolt protruding from the second component in the axial direction, and which protrude from the bolt or from the clamping screw in the radial direction.

A bolt extending in a fixed position from the first component can also mean that the bolt protrudes from an opening in the first component or extends through a through opening of the first component. The bolt is preferably fixed on the first component or fixable by means of screwing, in its axial direction.

Pre-clamping means here that the arrangement is clamped in a state prior to its actual operation, in which further forces or loads can act on the arrangement, as the case may be. A non-positive engagement/connection by force on all sides is preferably achieved since both a radial and an axial connection by force are adjustable in a defined manner.

By such a method, or a corresponding arrangement of the individual elements, geometric deviations due to manufacturing conditions from a setpoint geometry of the components and elements are compensated. This is why greater manufacturing tolerances are acceptable.

Such a method enables decoupling of axial and radial movements during the clamping of two components to be clamped together by means of a bolt or a conical clamping element set thereon, in a radial direction to the bolt. Coupling of axial and radial movements is still indirectly present due to the given geometry, since depending on the position of the locking nut or locking screws, an unambiguous relationship is maintained between the conical ratio of the surface of the conical component and the travel distance of the clamping nut or the clamping screw head, when the locking nut or locking screws leave a predetermined abutment space to the second component or a stop fixedly associated with the second component at the beginning of the clamping process.

With simple means and without specially required tools it is thus possible to clamp two components to be clamped with both a radial and an axial pre-clamping force. Moveability is not desirable, which is why a connection by force is effective on all sides so that the connection by force always acts on both components.

Preferably, with the aid of the clamping nut or the clamping screw, the clamping element is clamped while reducing the abutment space to zero and while building up a radial force between the components at such zero position. Thereafter, the clamping nut or the clamping screw are further tightened against the clamping element and/or against the locking nut, or against the at least one locking screw, after reducing the abutment space to zero, while further building up an axial force acting between the components. In particular, in a first clamping phase of the clamping nut, the radial force within the opening between the bolt and an inner sidewall of the opening increases. The axial force is only insubstantially increased during this first phase. In a second clamping phase, it is essentially only the axial force that is increased. Ideally, the radial force is no longer increased or only by less than 20% relative to the increase in the axial force, in particular by less than 10% in this phase. Despite this decoupling, both the axial force and the radial force are unambiguously predefinable and both adjustable by tightening only one single clamping nut or the clamping screw head. During these phases the components are in contact and directly adjacent to each other, or further components are interposed, wherein these are also adjacent to each other.

Preferably, the abutment space left is greater than zero to the second component as set depending on a conical inclination angle of the clamping element and depending on the radial force to be built up at the zero position. Additionally or alternatively, the abutment space can advantageously be adjusted as a number of turns of the thread to be rotated to the zero position and/or as a rotational angle of the clamping nut or the clamping screw up to the zero position.

Accordingly, additionally, a connecting arrangement for connecting at least one first and one second component to be connected with each other is preferred, in particular with a connection by force/non-positive engagement on all sides. The connecting arrangement herein comprises a through opening in the second component, a bolt, in a fixed position with respect to the first component, extending from the first component through the through opening in the second component, and on which a thread is formed at least spaced or facing away from the first component, a clamping nut, which is screwed onto the thread for clamping the components, and a cone pair including an inner cone with a split to enable expansion of the inner cone, and an outer cone. According to a first embodiment, the inner cone is formed as a conical clamping element, which is arranged for radial clamping on the bolt between the components and the clamping nut, and the bolt carries the outer cone or forms the outer cone. In particular, the outer cone is thus configured as an independent component or as a component part of the bolt. According to a second embodiment, the inner cone is arranged as a conical intermediate clamping element, which is expandable by means of the split for radial clamping, at least partially opposing a conical clamping element carrying or forming the outer cone, and between the bolt and the components. In both embodiments, a locking nut is screwed on the conical clamping element by means of a locking nut thread and clampable or clamped against an abutment surface of the second component to limit a moveability of the clamping element. In other words, a moveable part of the cone pair carries the locking nut in both embodiments.

Instead of such a bolt with a thread, on which the clamping nut can be screwed, the bolt can also be formed as a clamping screw with a head and with a thread, wherein the thread of the clamping screw can be screwed toward the first component at or behind the first component to clamp the components. The inner cone, as a conical clamping element, is then arranged for radial clamping on the bolt or on the shaft of the clamping screw between the components adjacent to one another and the head, when the bolt carries or forms the outer cone.

Instead of a locking nut or in addition thereto, at least one locking screw can be screwed by means of a locking screw thread as a locking element thread on the conical clamping element and limit a moveability of the clamping element when it is clamped against an abutment surface of the second component.

As far as conceivable at all in a shaft-hub connection, a possible axial connection by force need not be achieved with a second clamping element, which would not be part of the actual shaft-hub connection, however. This is unlike the present case, in which the radial and axial connection by force is created with the same clamping element. Each embodiment has as a common element a moveable clamping element with both a conical surface and a locking nut or locking screws adjustable on it.

A connecting arrangement is preferred in particular, in which an axial clamping element pre-clamping force of the locking nut or the locking screws acts against the second component in a defined or definable relationship to a radial force in the radial direction to the bolt or the shaft of the clamping screw.

In the clamped state, the conical clamping element is preferably radially clamped in an opening formed in the first component, wherein the bolt or the shaft of the clamping screw extends through this opening in the first component.

Preferably, the opening extends through the first component to be clamped, and the bolt or the clamping screw is clamped against the first component by means of a counter arranged on the side facing away from/opposing to the second component.

Preferably, according to an alternative embodiment, the opening is formed as a blind hole in the first component to be clamped, and the bolt is fixedly arranged, in particular screwed into it, by means of its end section facing away from/opposing to the second component, or the clamping screw is fixedly arranged at, in particular screwed into the first component by means of its end section facing away from the second component.

According to a further variant it is preferred if the bolt or the clamping screw has a section with a conical surface as a conical counter clamping element to the conical clamping element.

As an independent advantageous embodiment, a connecting arrangement is preferred, which comprises a plurality of such locking screws, wherein the locking screws are arranged distributed over a circumference of the clamping element and protrude through threaded bores in the clamping element adjustable toward the abutment surface of the second component. The locking screws also enable the use of such a clamping arrangement in an advantageous manner on an unworked, on an only conditionally worked, and on a non-planar surface of the abutment surface. The locking screws can be preferably implemented as worm screws, but also as normal screws. The locking screws are preferably arranged distributed over a circumference of the head section of the clamping element, which is axially moved, in order to achieve radial connection by force.

A washer can be set between the locking nut and the abutment surface or between the at least one locking screw and the abutment surface. The washer prevents damage to the surface of the abutment surface. This allows second components having a sensitive surface also to be clamped. The washer spreads the pressure of the end faces of the individual locking screws to a greater surface.

The conical clamping element with the inner cone preferably has a first section and a second section as two components separate from each other, wherein the locking nut or the at least one locking screw is screwed on the first section, and wherein the second section is conically formed and at least protrudes into the first component. In such an embodiment, the clamping element can be provided as a set with different lengths of the two sections, to enable flexible adaptation to each dimension of the components to be clamped. Cylindrical or conical intermediate pieces can also be set as extensions between the two sections as needed, such as when the thickness of the second component is very large.

The use of such a connecting arrangement is particularly preferred for carrying out such a method.

Surprisingly, with only few changes to well-known structural forms of connecting arrangements, and with a surprisingly simple modified methodology for clamping of components to be clamped, an advantageous expansion bolt arrangement is created, which makes such expansion bolts appear as novel connecting elements. In particular the splitted cone sleeve as a conical clamping element, or clamping sleeve achieves additional radial connection by force in addition to the proven positive engagement. This increases the rigidity of the connection substantially and prevents adverse micro movements in a joint between parts.

In addition to the radial connection by force, an axial connection by force is also created by means of the axially acting locking nut or locking screws. Herein, the ratio of the radial to the axial pre-clamping force can be adjusted independently from each other within a wide range. All the same, a single clamping screw or a single clamping nut is sufficient for radial and at the same time axial clamping, which is screwed on the bolt, and clamps the combined arrangement of the conical clamping element and the axial locking nut or locking screws screwed on it against the components to be clamped.

By forming the split in the conical clamping element, this can be more strongly expanded than is usual with clamping sleeves generally made of linearly elastic material, such as steel, so that coarser manufacturing tolerances of the openings, in particular formed as bores, can be accepted in the components to be clamped. This advantageously also reduces manufacturing costs. The other components are also made of metallic material, such as steel.

It is particularly advantageous that with such a splitted clamping element in the form of a conical clamping sleeve, extremely strong radial forces can be created, which not only compensate radial play in the opening but also achieve real radial pre-clamping. Transverse to the screw or bolt axis, a similar supporting behavior is thus achieved to the one hitherto only possible along the bolt axis. Especially, there is no unilateral lift-off of the conical clamping sleeve from the opening in operation, but the splitted clamping sleeve is always in full-surface contact to the opening along the entire inner circumference of the opening. Plastic deformations are thus advantageously avoided. Ultimately, this has the result that later release of the screw connection for maintenance work is enabled and thus the components can be repeatedly used.

There is thus a combination of a multitude of various aspects, which are uniformly realized according to the present embodiments in each single embodiment. These are a positively connecting connecting element, which can be used in addition for two or more parts to be connected with at least one common bore with a connection by force on all sides simultaneously, and in addition with adjustable axial and also radial pre-clamping for transmitting transverse forces or axial torsion moments with overlapping axial forces and bending moments.

Herein, the bolt is inserted, according to a particularly preferred embodiment, directly as an expansion bolt in a common opening or bore of the parts or components to be connected. For axial fastening, it can either be screwed into an inner thread in one of the parts to be connected, or otherwise attached to this corresponding component, or, according to an alternative embodiment, extend through both components to be connected and held beyond the sides facing away of the components to be connected by a nut or a screw head. According to the first embodiment, a clamping nut is screwed on the bolt on one side, which serves for clamping in a manner to be predefined.

As a further essential aspect, the expansion bolt, or the conical clamping element, respectively, is for positive connection/engagement, since the cross section of the openings or bores commonly extending through the two components is entirely filled by the clamping arrangement.

The radial connection by force is created by screwing a clamping element onto the bolt and tightening it, in the present case the clamping nut or the clamping screw. This exerts an axial pre-clamping force on the splitted sleeve with the inner cone, with which the sleeve is set/slided on a bolt or a further conical clamping element with an outer cone. The sleeve is expanded until it presses against the inner sidewall of the common opening. Since the sleeve as a preferred clamping element is designed in a splitted configuration, tangential stresses cannot build up in it, which would restrict radial expansion. The sleeve, especially, as a conical clamping element thus exerts a radial surface pressure on the interior of the common opening, which is in force equilibrium with the axial pre-clamping force of the clamping nut as the clamping element. The connection is thus pre-clamped in the radial direction in a connection by force.

As a further aspect, the radial pre-clamping can be limited by means of an axial locking nut or locking screws, which, depending on the embodiment, is/are screwed onto the splitted clamping sleeve or the splitted clamping element or counter clamping element, and subsequently is/are moved in the axial direction by means of the clamping nut or the clamping screw head until the locking nut or at least one of the locking screws is in abutment with the components to be connected. The conical clamping element can thus no longer move in the axial direction, and the radial pre-clamping cannot be further increased correspondingly.

With the axial locking nut or the at least one locking screw, the ratio between radial and axial pre-clamping can be adjusted in a selective manner. As long as the locking nut or the at least one locking screw does not abut on/touch the components to be connected, the axial pre-clamping force created by the clamping nut or the head of the clamping screw only achieves radial pre-clamping of the connection. As soon as the locking nut or the at least one locking screw abuts on or contacts the components to be connected, any further tightening of the clamping nut or the clamping screw will only further result in axial pre-clamping. The axial pre-clamping force created by the clamping nut or the clamping screw is thus first selectively exerted on the radial and then on the axial pre-clamping.

On the basis of the cone ratio of the conical clamping element or the conical intermediate clamping element, the ratio between the axial movement of the conical clamping element and the radial expansion of the clamping element or the counter clamping element contacting the inner side wall of the openings is unambiguously determined due to surprisingly simple geometric conditions. As long as there are no plastic deformations, the ratio between the axial pre-clamping force of the clamping nut or the locking screws and the radial pre-clamping is thus also determined. The radial pre-clamping or the radial force and the ratio of the axial pre-clamping or the axial force can thus be adjusted by means of the travel distance or stroke of the clamping element to be inserted.

According to the further aspect, the connection is preferably pre-clamped to such an extent, that the radial surface pressure exerted on the inner surface of the common openings is in force equilibrium with external loads. For transmitting transverse forces, the radial surface pressure is therefore greater than an average contact pressure at the hole, which the transverse force exerts on the clamping elements inserted in the opening. Axial torsion moments are transmitted by means of the friction arising between the clamping sleeve and the clamping element, respectively, or counter clamping element inserted in the opening and the components to be connected.

Additionally arising axial forces and bending moments are transmitted as with a conventional screw connection. For this purpose, the connection is axially pre-clamped clamped to such an extent that the components to be connected cannot lift off from each other.

BRIEF DESCRIPTION OF THE DRAWINGS

An exemplary embodiment will be explained in the following by means of the accompanying drawings. For different embodiments same reference numerals will be used in so far as each of the components or functions have the same or comparable form and effect, respectively. In particular, in further embodiments, preferably only those components and functions will be described which differ from the previously described embodiments. There are shown in.

DETAILED DESCRIPTION OF CERTAIN EMBODIMENTS

Figure 1:
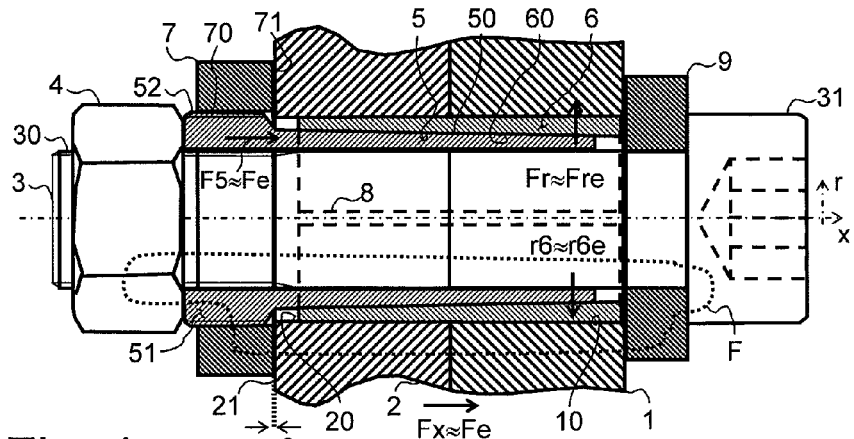
FIG. 1 a first embodiment of a connecting arrangement for clamping two components to be clamped, FIGS. 2A-2C steps of a connecting method for clamping of the components of such a connecting arrangement, FIG. 3 an embodiment of a connecting arrangement modified with respect to FIG. 1, FIG. 4 a further modified embodiment of a connecting arrangement, FIGS. 5A-5F a sequence for connecting two components of the connecting arrangement according to FIG. 4, FIG. 6 a further modified embodiment with a clamping screw instead of a bolt and a clamping nut, and a multi-part clamping element, FIG. 7 a further modified embodiment with locking screws instead of a locking nut, and FIG. 8 a further modified embodiment of a connecting arrangement.

As can be seen from FIG. 1, a connecting arrangement serves to connect at least one first component 1 and one second component 2. Basically, however, more than just two components can be clamped with each other, in particular whenever further components with corresponding through openings are placed between the first and second components 1, 2.

For clamping the first and second components 1, 2 to be clamped, a bolt 3 is provided, which extends through openings 10, 20, which are formed as through openings in the first and second components 1, 2, respectively.

In the embodiment shown, bolt 3 is formed as a screw having a screw head 31. Usually, but not necessarily, a washer 9 is placed between screw head 31 and the surface of the first component 1, surrounding the opening 10. The screw head 31 and the washer 9 thus form a counter bearing enabling clamping of this side of the bolt 3 against the first component 1 on the side of the first component 1 facing away from the second component 2.

Bolt 3, on its opposite end, i.e. on its end facing away from or spaced from the first component 1, has a thread 30, which acts for screwing a clamping nut 4 onto it. Clamping nut 4, by screwing onto the thread 30 of the bolt 3, acts for clamping the two components 1, 2 together.

As an essential component of the connecting arrangement, a conical clamping element 5 is arranged around the bolt 3, wherein the conical clamping element 5, with its end facing away from the clamping nut 4, at least partially extends into the area within the opening 10 of the first component 1. With its opposite end, which faces clamping nut 4, the conical clamping element 5 protrudes from the opening 20 of the second component 2 with a head section 51. The head section 51 of the conical clamping element 5 has an outer thread 52, which is formed for screwing an axial locking nut 7 on it.

Optionally, the opening 20 can also open out into an expanded opening in the direction toward the clamping nut 4, wherein the opening is sufficiently wide to also receive the axial locking nut 7 in an expanded opening section then also lying within the second component 2 thus lying in front of the opening.

In a manner differing from the drawing, the head section 51 can also be formed as a section of the conical clamping element not having a wider diameter, as long as it is solid enough to carry the axial locking nut 7 via the outer thread 52 in a sufficiently secure manner.

The conical clamping element 5 has a conical surface tapering toward the first component 1 as an outer cone 50, which comes into positively connection with a conical intermediate clamping element 6, which has a conical surface tapering toward the first component 1 on the inside at the inner diameter, as an inner cone 60. Thus an arrangement consisting of a cone pair with an outer cone 50 and an inner cone 60 is inserted between the bolt 3 and the two components 1, 2. A split 8 is formed in the clamping sleeve formed as a conical intermediate clamping element 6 with the inner cone 60, which extends from the end opposite, facing away from the clamping nut 4, i.e. the end facing the screw head 31, axially parallel to the axis of the bolt 3 through the intermediate clamping element 6. By these means a section of the intermediate clamping element 6 facing the screw head 31, in particular, is expandable by the conical clamping element 5, when the conical clamping element 5 is further clamped into the conical intermediate clamping element 6.

A surface facing the locking nut 7 of the second component 2 is formed as a stop 71 for the surface 21 of the axial locking nut 7 serving as a counter stop. Alternatively, any other component can also be formed as a stop, as long as a fixed connection, rigid in the axial direction, leads to the second component 2, which transmits axial forces.

Figure 2A:
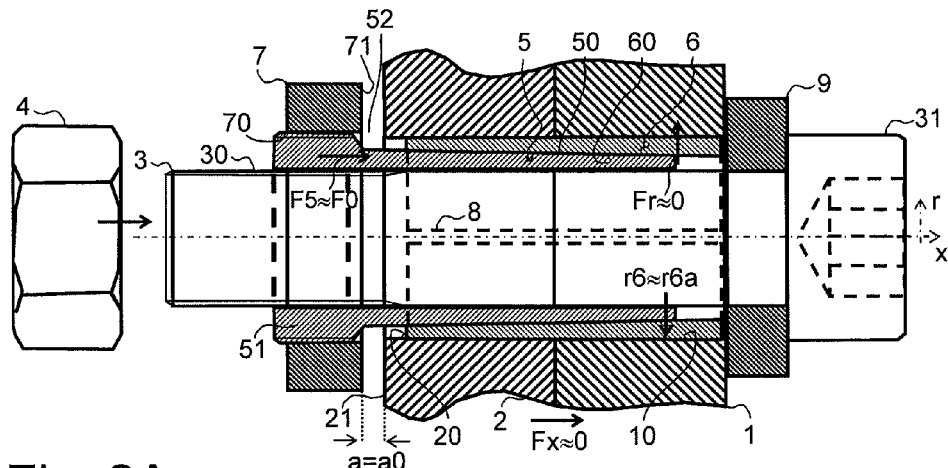

FIG. 2A shows a first intermediate step of a connecting method of the first and second components 1, 2, wherein the arrangement has been assembled to a point where both the conical intermediate clamping element 6 and subsequently the conical clamping element 5 have been inserted into the openings 10, 20 of the first and second components 1, 2, respectively. Thus a zero point is defined for the further method steps. Herein, the insertion of the conical clamping element 5 is preferably carried out to such an extent that manufacturing tolerances of the individual components and elements are compensated. This is achieved by fitting together the parts in question to such an extent that a radially continuous positively connection is established, but preferably there is not yet a radial connection by force. Preferably there is no expansion of the conical intermediate clamping element 6 in this position, so that the radial force Fr exerted in particular in the opening 10 of the first component 1 is not yet or not substantially effective. In this method step both an axially effective clamping element pre-clamping force F5 and the radial force Fr are thus preferably still negligible.

Subsequently, the axial locking nut 7 is screwed with its locking nut thread 70 onto the outer thread 52 of the conical clamping element 5 to such an extent that a defined abutment space a is left with an abutment space in a zero position a0 between the counter stop 21 on the second component 2 and the stop 71 on the locking nut 7.

The size of the abutment space in the zero position a0 is determined in a defined manner in such a way that with an axial offset of the conical clamping element 5 with the locking nut 7 not further rotated thereon, i.e. held fixed against rotation, into the opening of the conical intermediate clamping element 6, an increasing radial force Fr is created up to an end radial force Fre.

Figure 2B:
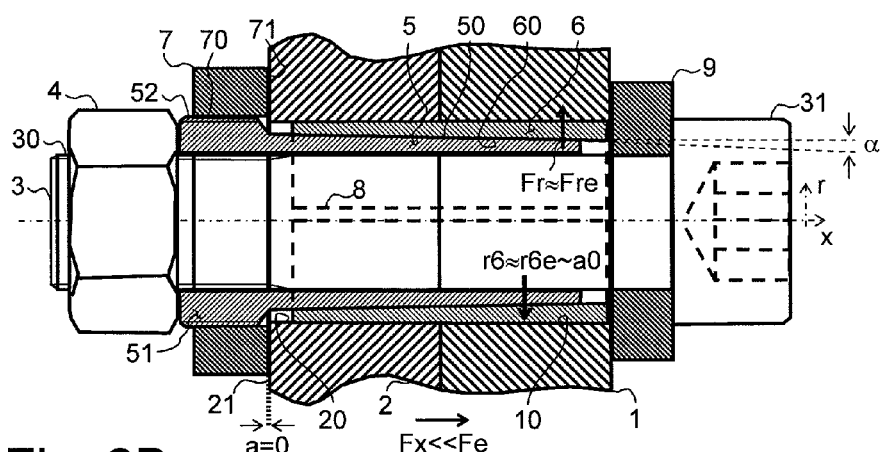

FIG. 2b shows the state with the conical clamping element 5, which has been inserted into the conical intermediate clamping element 6 to such an extent, as is made possible by the original abutment space in the zero position a0. In other words, the conical clamping element 5 has been inserted into the conical intermediate clamping element 6 to such an extent that the axial locking nut 7 with its counter stop 71 abuts on the stop 21 of the second component in a completely adjacently supported/touching relationship.

The inserting of the conical clamping element 5 has been carried out according to FIG. 2b by clamping the conical clamping element 5 with the clamping nut 4 against the counter force of the counter bearings, i.e. in particular the screw head 31 against the two components 1, 2 to be clamped. Herein, there is no rotation of the axial locking nut 7 relative to the conical clamping element 5, so that the reduction of the space of the axial locking nut 7 relative to a conical inclination angle α of the conical outer and inner cone 50, 60, respectively, of the conical clamping element 5 and the conical intermediate clamping element 6, respectively, determines the radial force Fr in a defined manner. In other words, the end radial force Fre can be determined for each application by predetermining the abutment space in zero position a0 measurable as a length. Alternatively, when pitch of the thread 30 of the bolt 3 is known, a number of rotations of the clamping nut 4 can also be used as a criterion for defining the end radial force Fre in an equal manner.

In the intermediate position of the clamping method shown in FIG. 2b, the radial force Fr already corresponds approximately to the end radial force Fre. Moreover, a radius r6 of the conical intermediate clamping element 6 at a position of interest is increased from a radius r6 of the unclamped intermediate clamping element 6 to a radius r6e of the clamped intermediate clamping element 6 proportional to the insertion distance of the conical clamping element 5 into the conical intermediate clamping element 6.

The first clamping of the connecting arrangement by means of clamping nut 4 in the axial direction x thus primarily results in a radial clamping while exerting the end radial force Fre in the radial direction r. In the clamping position shown in FIG. 2b of the clamping nut 4, an axial force Fx in axial direction x has a value equal to zero or a negligibly small value.

The end axial force Fe is achieved by further clamping the clamping nut 4. This further clamping of the clamping nut 4 primarily causes, however, merely a tighter clamping of the components 1, 2 to be clamped in the axial direction x, and does not lead or not substantially lead to an increase in the end radial force Fre. Finally, the clamping element pre-clamping force F5 also corresponds to an end force value of the end axial force Fe.

Figure 3:
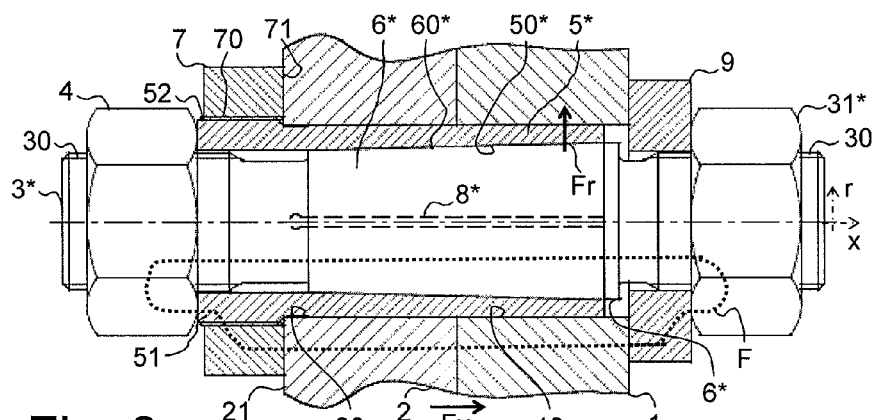

FIG. 3 shows an alternative connecting arrangement ultimately with the same clamping principles. Instead of the conical clamping element, which is inserted between a cylindrical bolt and a splitted sleeve formed as a conical intermediate clamping element, in this connecting arrangement, a modified bolt 3* is formed as a conical counter element 6*. The section lying within openings 20, 10 of the second and first components 2, 1, respectively, has a conical outer cone 60*, which has an increased diameter or outer circumference as it further extends into the opening 10.

Correspondingly, the conical clamping element 5* is inserted into openings 20, 10 in an embodiment also modified with respect to the first embodiment. The conical clamping element 5*, which carries the axial locking nut 7, is formed with a cylindrical outer surface and having an inner circumference which increases as it extends from the area within the second opening 20 into the area within the first opening 10. The conical clamping element 5* therefore carries a conical inner cone 50*. The conical clamping element 5*, according to the second embodiment, also has a split 8*, which at least partially extends from an end opposed to axial locking nut 7 or the outer thread 52 provided for axial locking nut 7, into the conical clamping element 5*. This is how the conical clamping element 5* is expandable in interaction with the conical counter clamping element 6* as the conical clamping element 5* is further inserted, and is therefore clampable against the opening sidewalls of the second and the first openings 20, 10.

The second embodiment shown also has a threaded bolt as a bolt 3* instead of a bolt with a screw head, on which a nut 4 can be screwed on both end sections. Thus the nut opposed to the actual clamping nut 4 is arranged as a counter nut 31* serving as a counter bearing and is brought into a defined and thereafter preferably unchanged position prior to the first clamping of the clamping nut 4. Basically, an axial clamping can also be carried out by means of this counter nut 31*.

Figure 4:
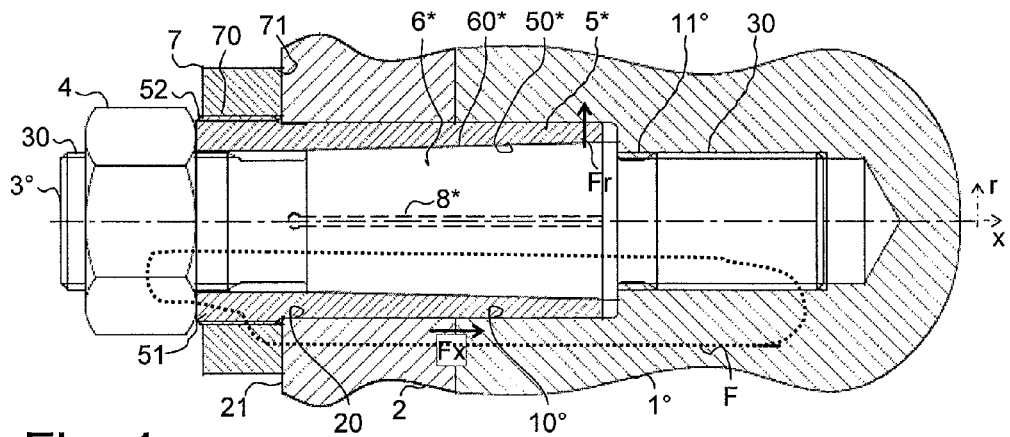

FIG. 4 shows a further modified embodiment, in which the first component 1° is formed in a modified manner. Instead of a through opening, the first component 1° has a blind hole, which only extends into the first component 1°.

In this case, the bolt 3° is screwed into the first component 1° in a fixed position by means of a bolt receiving thread 11°. Optionally, however, the bolt 3° could also be fixedly attached to the first component in a different manner from being screwed in, such as welded onto the first component. Basically, a lathed embodiment would also be possible, in which the bolt is formed as an integral part of the first component, as long as an opening 10° is left about the former, partially extending into the first component 1°, which is for receiving the conical clamping element 5* and for radially clamping it and the conical counter clamping element 6*.

Figure 2C:
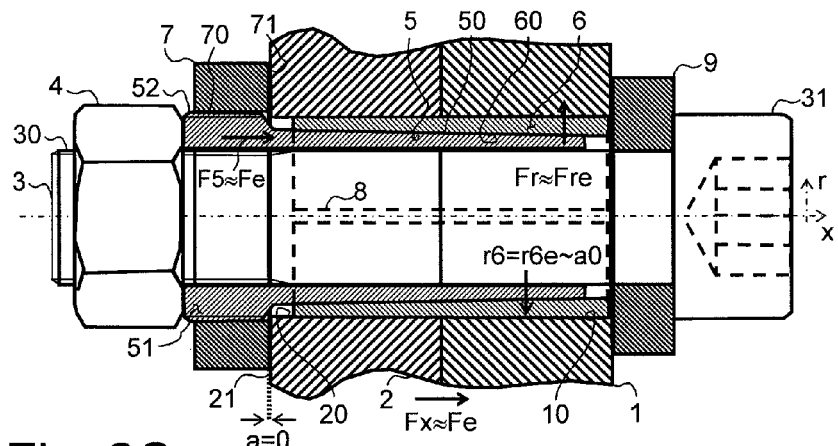

FIGS. 5A-5F show a method sequence according to the third embodiment comparable to the method sequence described with reference to FIGS. 2A-2C.

Figure 5A:
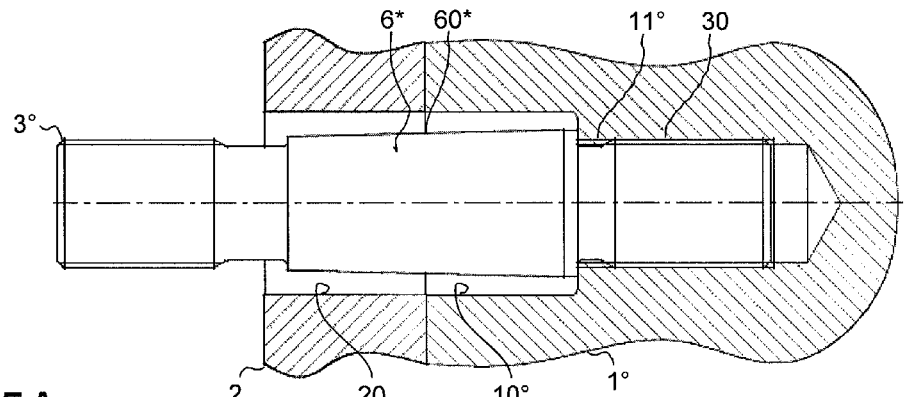

FIG. 5A shows an early method step, in which the bolt 3° is screwed into the thread 11° of the first component 1°. At the front side of the thread, the bolt 3° extends through the opening 10° of the first component 1° and then through the opening 20 of the second component 2. Herein, a free space is left between the conical outer circumference of the bolt 3° with the outer cone 60* and the inner wall of the two openings 10°, 20.

Figure 5B:
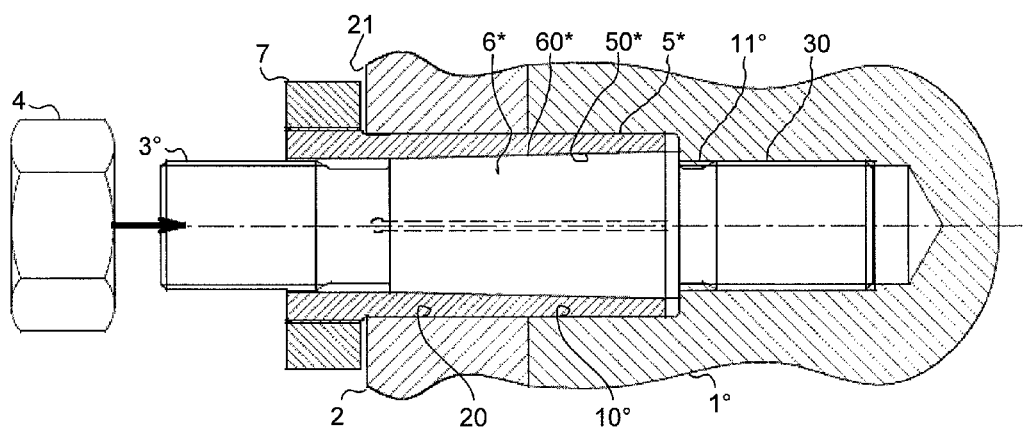

In the following, as illustrated in FIG. 5b, the conical clamping element 5* is inserted into this free space to such a point, as permitted by the outer cone 60* of the bolt 3° and the inner cone 50* of the conical clamping element 5* set on it, to compensate manufacturing tolerances and to achieve radial positive engagement. By these means the zero point is defined. Subsequently, the axial locking nut 7 is rotated on the conical clamping element 5* into the abutment space at the zero position a, and then the clamping nut 4 is screwed onto the bolt 3°.

Figure 5C:
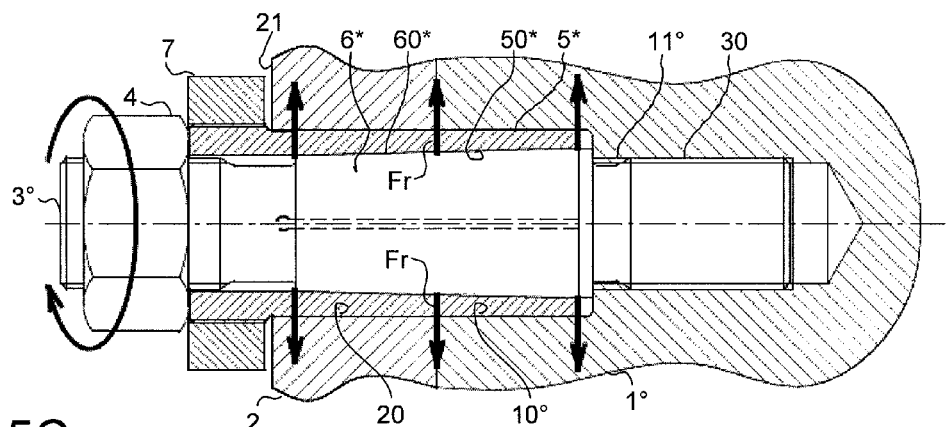
Figure 5D:
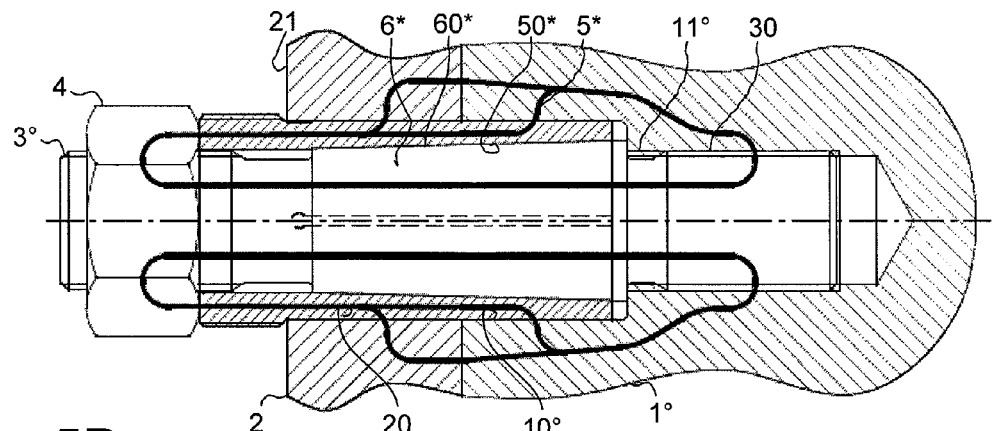

FIG. 5C illustrates the increasingly effective radial load and radial force Fr, respectively, as the clamping nut 4 is screwed against the conical clamping element 5*, as long as the locking nut 7 does not abut on the stop 21. As illustrated in FIG. 5D by means of solid lines, a force flux is thus achieved in the components 1°, 2 thus clamped with each other, and further elements, i.e. the bolt 3°, the conical element 5* and the clamping nut 4.

Figure 5E:
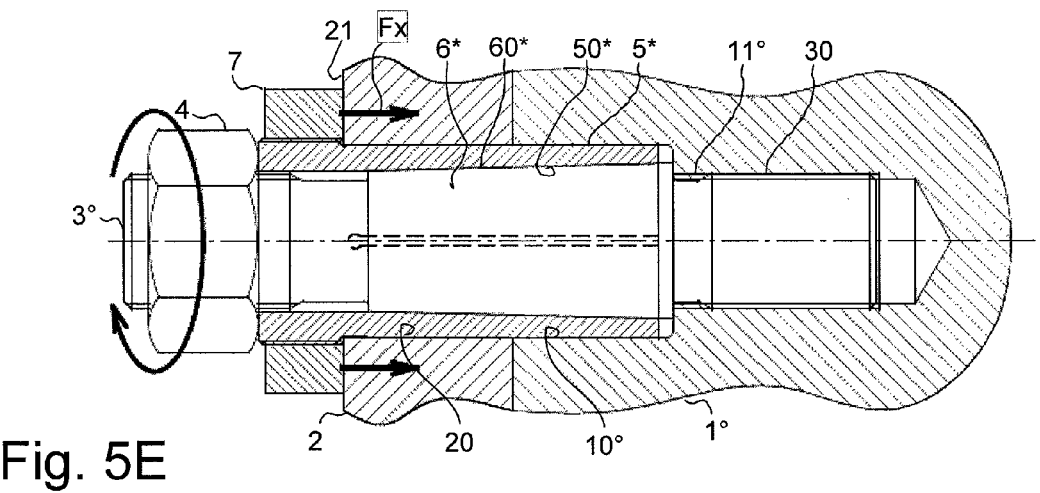
Figure 5F:
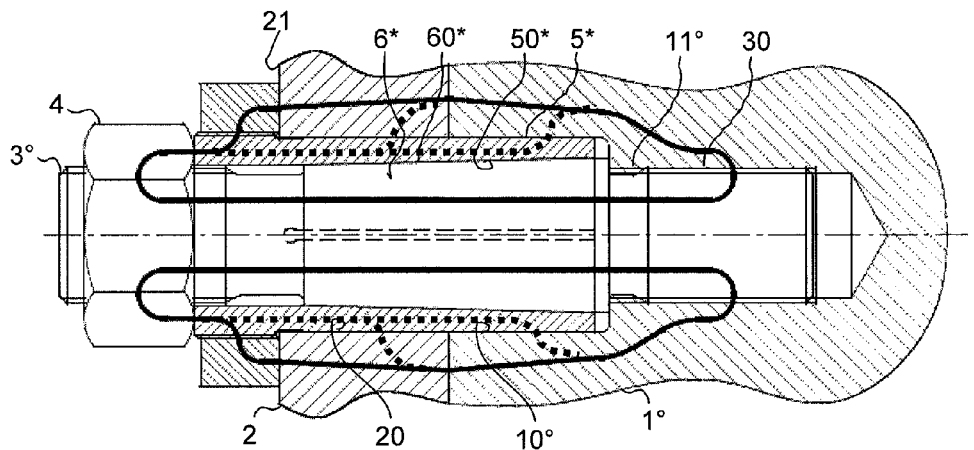

FIG. 5E illustrates the force change after the locking nut 7 abuts on the stop 21 as the clamping nut 4 is further tightened. The increasingly increasing axial force Fx is effective. FIG. 5F shows the connecting arrangement in the end position with the pre-clamping forces acting on all sides. By means of solid lines, the axial force flux in the components 1°, 2 thus clamped with each other, and further elements, i.e. the bolt 3°, the conical element 5* and the clamping nut 4 is illustrated, and the radial force flux deviating from the latter is shown by means of dotted lines.

Figure 6:
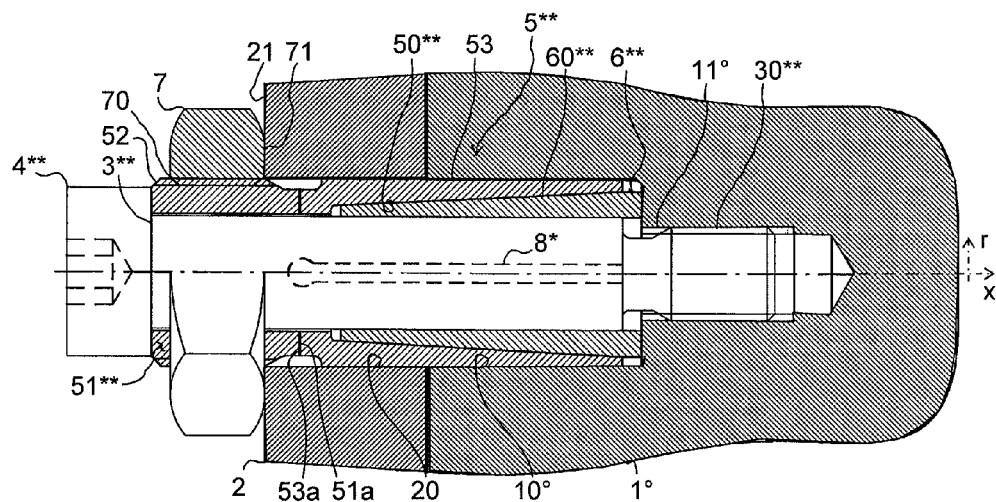

FIG. 6 shows a further modified embodiment wherein, instead of a bolt with a clamping nut, a bolt formed as a clamping screw 3 extends from the first component 1° to be clamped through the second component 2 to be clamped. The clamping screw 3 has a clamping screw head 4, and on the end section facing away from the clamping screw head 4, it has a thread 30. In the assembled state, the thread 30 of the clamping screw 3** is again screwed into a bolt receiving thread 11* in the first component to be clamped. Embodiments with a bolt and a clamping nut are preferred for arrangements with large dimensions. In contrast, an embodiment with a bolt formed as a clamping screw 3** allows dimensioning with very small elements having a diameter of 20 mm, in particular, or less.

As a further difference, in the embodiment according to FIG. 6, a conical clamping element 5** is inserted as a splitted clamping sleeve, i.e. having a split 8*, in particular, with an inner cone 50. The inner cone 50 cooperates with a counter clamping element 6 set between the inner cone 50 and the bolt formed as a clamping screw 3. The sleeve-like counter clamping element 6 is formed as an outer cone 60. Preferably, but not necessarily, the end of counter clamping element 6 facing the thread 30 of clamping screw 3 is adjacent touching/supporting in the axial direction x, on a back wall of through opening 10* in the first component 1* to be clamped. The conical clamping element 5** extends with an inner circumference increasing as it extends away from the locking nut in the axial direction.

According to a further embodiment, which can also be independently implemented, the conical clamping element 5** is formed as a multi-part clamping element. It is subdivided, in particular, into a first section of the clamping element 5* and a second conically extending section 53 of the clamping element 5. The first section 51 carries the outer thread 52 for screwing the axial locking nut 7 onto it, and extends a certain distance into the through opening 20 of the second component 2 to be clamped in axial direction x. On this side, the first section 51 has an end-side abutment surface 51a, which, in the inserted and clamped state, presses against a correspondingly formed abutment surface 53a of the second conical section 53. A modular system is established in this manner. It makes possible the use of cylindrical intermediate pieces or first sections 51 extending into through opening 20 to different depths, depending in particular on the thickness or width of the second component 2 to be clamped.

Figure 7:
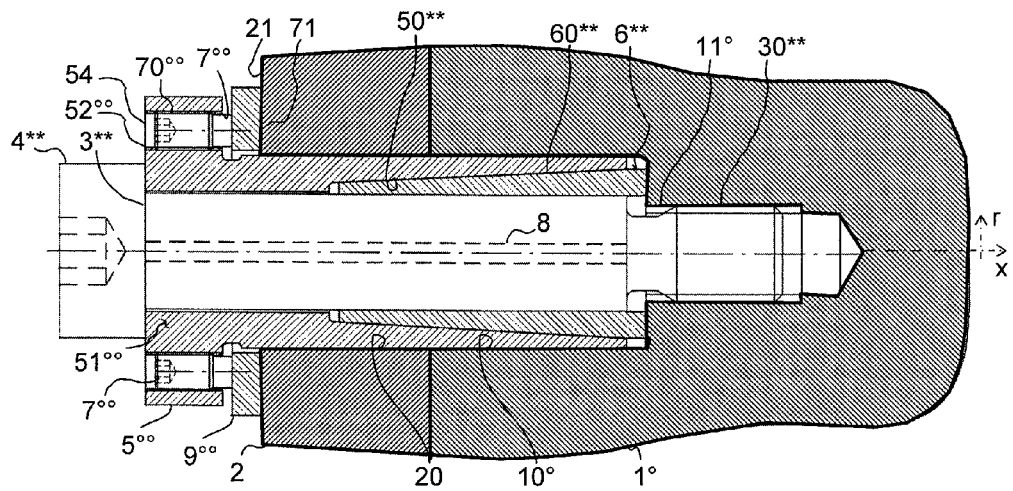

FIG. 7 shows an even further modified embodiment, which can be implemented independently or in combination with the other described embodiments. Instead of a locking nut, at least one locking screw 7°°, preferably a plurality of locking screws 7°° is/are used. Instead of an outer thread, the conical clamping element 5°° correspondingly has a plurality of threaded bores 54, which extend in a direction axially parallel to the axial direction x through a head section 51°° of the conical clamping element 5°°. In each of the threaded bores 54, or in their inner threads 52°°, one of the axial locking screws 7°° with their locking screw thread 70°° is inserted as a locking element. Worm screws are shown in an exemplary manner, locking screws protruding on both sides from threaded bore 54 could also be used, however.

The locking screws 7°° extend from the head section 51°° of the conical clamping element 5°° toward the second component 2.

Preferably, a washer 9°° is inserted between the locking screws 7°° and an abutment surface in form of the stop 21 of the second component 2 to be clamped. By these means, the end-side surfaces of the locking screws 7°° do not contact individual points of the surface of the second component 2 to be clamped, when the final clamped state is reached. Thus during assembly, not one locking nut is screwed up to a defined distance to the surface or stop 21 of the second component 2 to be clamped, but the plurality of the locking screws 7°° is screwed up to a predefined distance from the stop 21 or a surface of the washer 9°° facing the locking screws 7°° in a corresponding manner.

Figure 8:
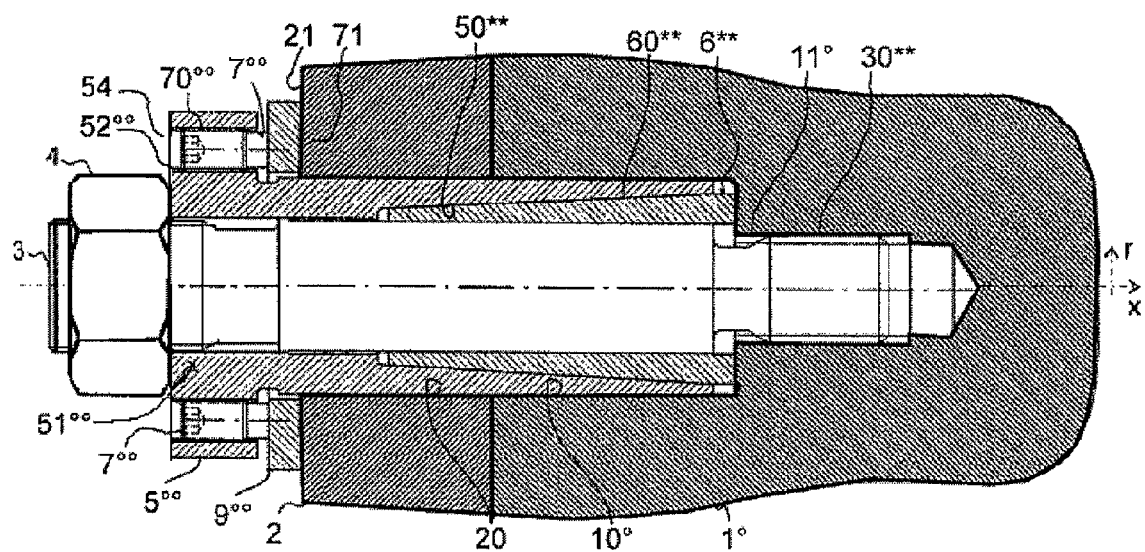

Instead of a locking nut adjustable in its travel distance, thus a plurality of locking screws is used in the form preferably of threaded pins, wherein, in the embodiment shown, again, a clamping screw 3 is used as a clamping bolt for end clamping. Instead of the clamping screw 3, a bolt with a clamping nut could of course also be used, for example, as shown in FIG. 8. Instead of the locking nut, an arrangement of decentralized locking screws is thus used, which makes a travel distance adjustable in advance in a limited passive manner. The possibility of leveling even uneven surfaces of the second component 2 to be clamped is particularly advantageous.

LIST OF REFERENCE NUMERALS 1, 1° first component to be clamped
10, 10° opening in 1, 1°
11° bolt receiving thread in 1°
2 second component to be clamped
20 through opening in 2
21 stop for 7
3, 3*, 3° bolt
3** clamping screw as a bolt
30 thread on 3**
30 thread on 3
31 screw head on 3
31* counter bearing/counter nut on 3
4 clamping nut
4** clamping screw head
5, 5*, 5**, 5°° conical clamping element, in particular clamping sleeve
50 outer cone of 5
50*, 50** inner cone of 5*, 5**
51, 51°° head section of 5
51 first section of 5
51a abutment surface of 51**
52 outer thread on 51
52°° inner thread in 54
53 second, conical section of 5**
53a abutment surface of 53
54 threaded bore in 51°°
6, 6*, 6** conical intermediate clamping element/counter clamping element to 5
60 inner cone of 6
60*, 60** outer cone of 6*, 6**
7 axial locking nut as a locking element
7°° axial locking screw as a locking element
70 locking nut thread in 7
70°° locking screw thread on 7°°
71 counter stop to 21
8, 8* split in 5 and 6, respectively
9, 9°° counter bearing/washer
a abutment space between 71 and 21
a0 abutment space in zero position
F force flux
F5 clamping element pre-clamping force
Fr radial force
Fre end radial force
Fx axial force
Fe end axial force
r radial direction to 3
r6 radius of the unclamped intermediate clamping element 6
r6e radius of the clamped intermediate clamping element 6
x bolt axis
α conical inclination angle

The invention claimed is:

1. A connecting arrangement connecting at least one first and one second component to each other through radial and axial forces, comprising:
   a bolt on which a thread is formed, the bolt extending in a fixed position with respect to the first component from the first component through a through opening in the second component, wherein the thread extends out of the through opening in the second component exteriorly beyond an abutment surface of the second component;
   a clamping nut screwed onto the thread of the bolt;
   a cone pair comprising an inner cone with a split for enabling an expansion of the inner cone, and an outer cone,
   wherein the inner cone or the outer cone forms at least a portion of a conical clamping element, the conical clamping element having a first portion positioned exterior to the through opening and between the components and the clamping nut and a second portion extending into the through opening; and
   a locking nut or at least one locking screw screwed at least partially onto or into, respectively, the first portion of the conical clamping element by means of a threaded coupling such that the locking nut or at least one locking screw is exterior to the second component and faces the abutment surface of the second component,
   wherein the locking nut or the at least one locking screw is clamped against the abutment surface of the second component by the clamping nut to limit the moveability of the conical clamping element when the clamping nut is screwed onto the thread of the bolt, and
   wherein the connecting arrangement connects the first component and the second component through radial and axial forces.

2. The connecting arrangement according to claim 1, wherein a pre-clamping force of the locking nut or the at least one locking screw against the abutment surface of the second component is in a definable ratio to a radial force in the radial direction of the bolt.

3. The connecting arrangement according to claim 1, wherein the conical clamping element, in a clamped state, is radially clamped in an opening formed in the first component, wherein the bolt extends through this opening in the first component.

4. The connecting arrangement according to claim 3, wherein the opening extends through the first component to be clamped, and the bolt is clamped against the first component by means of a counter bearing on a side of the first component facing away from the second component.

5. The connecting arrangement according to claim 3, wherein the opening is formed as a blind hole in the first component to be clamped, and the bolt is fixedly arranged at, in particular screwed into, the first component with a closed end section of the first component facing away from the second component.

6. The connecting arrangement according to claim 1, wherein the bolt has a section with a conical surface, which comprises the outer cone, and which acts as a conical counter clamping element for the conical clamping element.

7. The connecting arrangement according to claim 1, wherein all components transmitting radial and axial forces are made of a metallic material.

8. The connecting arrangement according to claim 1, which comprises a plurality of such locking screws, wherein the locking screws are arranged distributed over a circumference of the clamping element and extend through threaded bores in the clamping element adjustable toward the abutment surface of the second component.

9. The connecting arrangement according to claim 8, wherein the locking screws are arranged distributed over a circumference of a head section of the clamping element.

10. The connecting arrangement according to claim 1, wherein a washer is inserted between the locking nut and the abutment surface or between the at least one locking screw and the abutment surface.

11. The connecting arrangement according to claim 1, wherein the first portion of the conical clamping element and the second portion of the conical clamping element are two separate components in contact with each other in the through opening, wherein the locking nut or the at least one locking screw is screwed onto or into the first portion, and wherein the second portion is conically formed and extends at least into the first component.

12. The connecting arrangement of claim 1, wherein the connection is with connection by force on all sides.

13. A method for making the connecting arrangement connecting at least one first and one second component to each other according to claim 1, wherein:
   the bolt extending in a fixed position from the first component is extended through the through opening in the second component,
   on the thread on the bolt, the clamping nut is screwed for clamping the components, or the clamping screw with a head and a thread is screwed toward the first component on or behind the first component for clamping the components,
   prior to screwing the clamping nut or prior to screwing-in the clamping screw, the conical clamping element is inserted in a direction toward the first component between the components adjacent to each other and the clamping nut or between the components adjacent to each other and the head for radial clamping at or on the bolt,
   after inserting the clamping element, the locking nut or at least one locking screw is screwed onto the clamping element while an abutment space greater than zero is left with respect to the second component, and
   subsequently the clamping nut or the head of the clamping screw is clamped against the conical clamping element and/or against the locking nut or against the at least one locking screw.

14. The method according to claim 13, wherein:
   with the aid of the clamping nut or the clamping screw, the conical clamping element is clamped while reducing the abutment space to zero while building up a radial force built-up between the components up to such a zero position, and
   the clamping nut or the clamping screw is further clamped while acting against the clamping element and/or against the locking nut or against at least one locking screw after reducing the abutment space to zero while building up an axial force increasingly built-up between the components.

15. The method according to claim 14, wherein the abutment space greater than zero left with respect to the second component is adjusted depending on a conical inclination angle of the clamping element and depending on the radial force to be built up at the zero position.

16. The method according to claim 13, wherein the abutment space is adjusted as a number of turns of the thread to be rotated up to the zero position and/or as a rotation angle of the clamping nut or the clamping screw up to the zero position.

17. The method of claim 13 wherein the clamping nut is screwed on a thread at least spaced from the first component.

18. The method of claim 13, wherein the clamping nut is facing away from the first component.

19. The method of claim 13, wherein the connection is with non-positive engagement or connection by force on all sides.

20. The connecting arrangement of claim 1, wherein the bolt comprises a shaft of a clamping screw, and wherein the clamping screw further comprises a head positioned on an opposite end of the clamping screw from the thread formed on the bolt.

* * * * *